United States [11] 3,614,203

| [72] | Inventor | Eugene C. Letter<br>Penfield, N.Y. |
|---|---|---|
| [21] | Appl. No. | 465,837 |
| [22] | Filed | June 18, 1965 |
| [45] | Patented | Oct. 19, 1971 |
| [73] | Assignee | Bausch & Lomb Incorporated<br>Rochester, N.Y. |

[54] HIGH-SPEED OPTICAL SHUTTER
11 Claims, 4 Drawing Figs.

[52] U.S. Cl............................................. 350/160,
350/312
[51] Int. Cl............................................... G02f 1/34
[50] Field of Search.......................... 88/61 A, 61
J; 350/160, 167

[56] References Cited
UNITED STATES PATENTS
| 2,986,982 | 6/1961 | Kaprelian..................... | 88/61 A |
| 2,997,922 | 8/1961 | Kaprelian..................... | 88/61 J |
| 3,008,374 | 11/1961 | Kreisman..................... | 88/61 A |

*Primary Examiner*—Verlin R. Pendegrass
*Attorneys*—Frank C. Parker and David E. Dougherty CLAIM: 1. A high-speed optical shutter comprising a prism of high refractive index having an internally reflecting optical surface;
  a layer of reflection-changing material spaced from the optical surface of the prism, said layer including a fluid carrier having high refractive index and having radiation absorption means;
  an electrically conducting film contacting the layer, and means for applying an electrical potential to the conducting film;
  means for directing electromagnetic rays toward the optical surface at an incident angle greater than the critical angle for total reflection, as defined by the refractive index of the prism and the space between the prism and the layer of reflection-changing material;
  means for discharging the electrical potential across the conductive film and contacting the layer of reflection-changing material with the optical surface of the prism to absorb the electromagnetic rays.

INVENTOR.
EUGENE C. LETTER
BY
ATTORNEYS

HIGH-SPEED OPTICAL SHUTTER

This invention relates to an optical shutter and more particularly to a novel shutter for high-speed applications.

Studies of combustion, corona discharge, explosions, plastic and elastic deformation and shock wave phenomena frequently call for detailed photographs taken at shutter speeds for a few microseconds. Ballistics dynamic testing and chemical reactions also require pictures taken at similar speeds. At these relatively high speeds, it is also desirable to shutter a relatively large aperture. For example, a relatively large aperture allows adequate light to enter the optical system during the relatively short time intervals.

A high-speed optical shutter according to the present invention may be opened or closed in less than 100 microseconds. The opening or closing speeds may be reduced to less than 50 microseconds. Accordingly, a system of this type may be used in combination with framing cameras. Further, because of the relatively large aperture which can be opened or closed at high speed, the devices are particularly applicable in any area requiring a relatively high-speed light valve. Advantageously, the light valve may be opened or closed and readily reset for the next operation. Additionally, a shutter or light valve according to the invention may be triggered by an event itself. For example, a flash of light may be used to trigger the light valve or electronic means may be incorporated for that purpose.

The operation of a shutter according to the present invention is based upon the principle of internal reflection. This well-known principle is explained in some detail in the text "The Principles of Optics" by A. C. Hardy and F. H. Perrin (1932), pages 26 through 28, as well as numerous other optical textbooks. The principle states that electromagnetic radiation, such as light rays, incident on a surface in a first medium of high refractive index are reflected from the surface of a second medium. If the index of the second medium is less than the index of the first medium, the angle of refraction $x$ which corresponds to the angle of incidence $\Phi$ is not real if $$\sin x = \sin \Phi / n > 1$$

When light rays are incident on the surface at an angle greater than this critical angle, the incident light is totally reflected. When the refractive index of the second medium contacting the first medium is increased, the critical angle is increased.

The shutters according to the present invention represent an improvement over the shutters disclosed and claimed in my copending application on a "SHUTTER" Ser. No. 335,694, filed Jan. 3, 1964 and assigned to the same assignee as the present invention.

Briefly, the shutter disclosed herein comprises an optical element such as a prism which is disposed in a light path so that one surface is greater than the critical angle of internal reflection with respect to an incident light ray. A substrate is disposed relatively close to the critically disposed surface. The substrate which may be made of plastic or some other suitable material has a relatively thin conducting film such as aluminum, gold, etc. deposited thereon. A light-absorbing layer is disposed on the conducting film. The absorbing layer preferably comprises a dispersion of carbon black in a suitable fluid medium. Means are provided for displacing the absorbing layer from the substrate and onto the adjacent surface to thereby change the reflecting condition of the shutter.

A presently preferred embodiment of the invention includes electrical means for displacing the layer of reflection-changing material to contact the layer with the optical surface of the prism. The electrical discharging means may, for example, include a capacitor which is operatively connected to the conducting film, so that, an electrical discharge across the film destroys the film and deposits the optically absorbing mass against the critical surface. Additionally, means may be provided for removing the absorbing material from the critically disposed surface to thereby return the shutter to its original condition.

The invention will now be described in more detail in connection with the accompanying drawings, in which.

Figure 1:
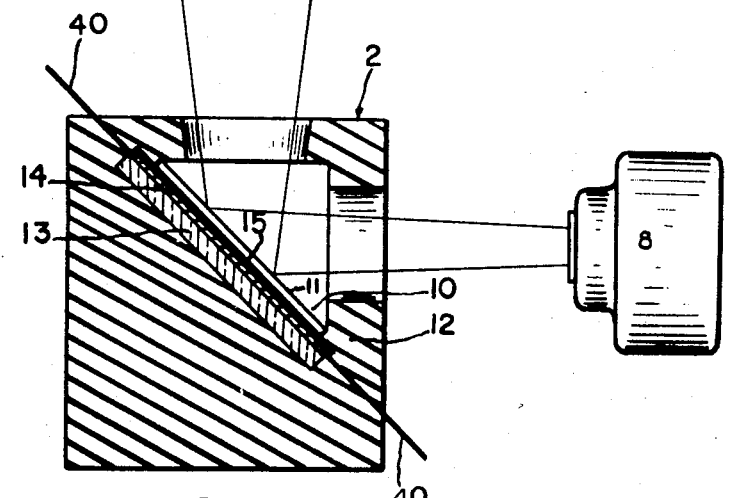
FIG. 1 is a cross-sectional view illustrating a presently preferred embodiment of the invention.

The first embodiment of the invention will be described in connection with FIG. 1 wherein a shutter 2 is shown in an open condition. Light rays are directed onto the shutter 2 by an inclined mirror 4 and a lens 6. In this embodiment, the shutter 2 acts as an inclined mirror for directing light rays to a camera 8.

The shutter 2 includes an optical element 10 such as an inclined plate. The element 10 is mounted in a housing 12, and is disposed in the light path so that a substantially flat optical surface 11 is disposed to obtain internal reflection with respect to incident light directed toward the optical surface. Light incident upon the surface 11 is reflected toward a camera 8 when the shutter is in an open condition.

A glass substrate 13 has a conducting film 14 disposed thereon. The film may comprise a thin layer of aluminum, gold or other metal which has suitable characteristics. For example, the film should have a relatively high conductivity and yet resist any chemical attack by the materials selected for a reflection-changing coating 15. Layer 15 includes a carrier fluid which is applied to the film 14. The carrier fluid should be relatively viscous, for example, pastelike in order to minimize any problems which might be associated with a low-viscosity material. The coating of optically absorbing fluid 15 is applied to the film 14.

The coating comprises carbon black dispersed in a suitable carrier such as dibutyl phthalate. Various materials have been found to be satisfactory as a carrier. The liquid should not decompose into undesirable reaction products upon being subjected to an electrical discharge.

A water dispersion has been found to be relatively satisfactory since a relatively low voltage is sufficient to obtain a relatively fast closure time. However, since the index of refraction of water does not match the index of refraction of the prism 10, the completeness of closure is not as good as it is when the fluid index matches the prism index. Glycerine carriers have also been employed and have been found satisfactory for time of closure, optical density, and dielectric properties.

The preferred radiation absorption means is carbon black which must have a small particle size of relatively large surface area for radiation absorption. The particle surface areas of those carbon blacks which comprise the presently preferred embodiment of the invention have been shown to range from 1,000-1,700 square meters per gram or 10-13 millimicrons particle diameter measured by nitrogen absorption. Some examples of suitable materials are "NEO Spectra Mark II," "NEO Spectra Mark I" or "Royal Spectra," available from Columbian Carbon Co. See, for example, Columbian Carbon Co. Technical Service Bulletin No. 201-A.

Figure 2:
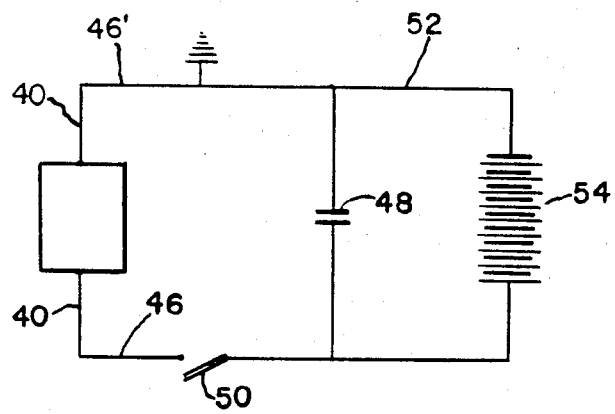
FIG. 2 is a schematic diagram showing electrical means for changing the condition of the shutter shown in FIG. 1.

The electrical circuit is shown in more detail in FIG. 2. The electrodes 40 are connected by leads 46, 46' in parallel with a capacitor 48 when a switch 50 is closed. The capacitor 48 is also connected by the leads 52 to electrical means 54 for producing a high-voltage discharge of between 1,000 and 20,000 volts. The capacitor is charged by the electrical means 54 and discharges across the electrodes when the switch 50 is closed. The electrical discharge across the electrodes 40 destroys the film 14 and deposits the optically absorbing layer 15 onto the surface 11.

The capacitor 48 may have a capacitance of between 0.1 and 2.0 microfarads. For example, a 10,000 volt source of electricity coupled with an 0.5 microfarad capacitor has been found to close a shutter of about 2 inch diameter in about 50 microseconds.

In the operation of the device according to the presently preferred embodiment of the invention, the reflection-changing layer is disposed on the substrate. The light rays which are incident upon the surface 11 are totally reflected thereby and directed toward the camera 8. In order to close the shutter, the switch 50 is closed to thereby produce an electrical discharge across the electrodes. The discharge displaces the optically absorbing material from the substrate and contacts the material with the surface 11. Depositing the absorbing material on the surface 11 overcomes the total reflection and absorbs the electromagnetic rays to thereby close the light valve. The surface 11 may be cleaned to remove the reflection-changing material in order to restore the shutter to its open condition.

Figure 3:
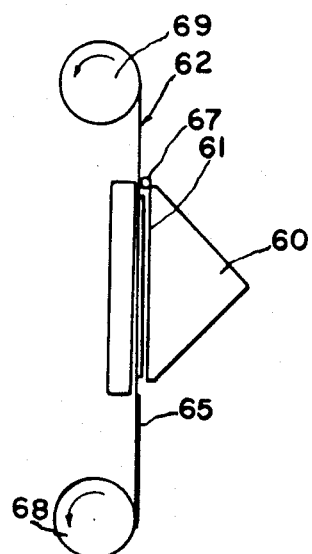
FIG. 3 is a diagrammatic view illustrating a second embodiment of the invention.
Figure 4:
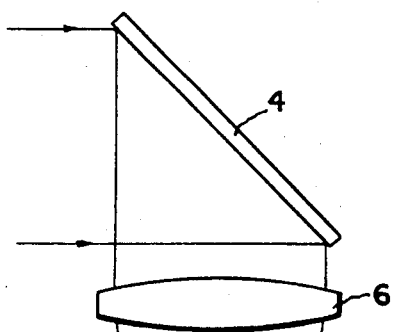
FIG. 4 is a plan view illustrating the second embodiment of the invention.
Figure 4:
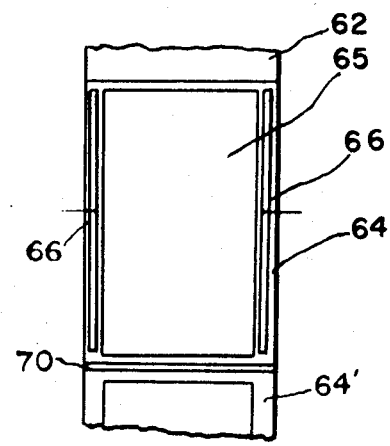

The second embodiment of the invention is illustrated by FIGS. 3 and 4.

An optical element 60 comprises a prism which has a surface 61 disposed at the critical angle of reflection with respect to an incident light ray. A filmstrip 62 is disposed adjacent the surface 61 and between the surface 61 and a film support 63. A conductive layer 64 is deposited on the film 62 and supports a layer 65 of an optically absorbing material. A pair of contacts 66 contact the layer 64 on the outer edges thereof and are connected to electrical means (not shown). An electrical discharge across the contacts destroys a portion of the layer 64 and deposits the optically absorbing material on the surface 61 to thereby close the shutter.

After closing the shutter a wiper 67 is drawn across the surface 61 to remove the optically absorbing material. A second portion of film is removed from the roll 68 and moved into an adjacent position with respect to the surface 61 by advancing the takeup roll 69. Usually the conductive layer 64 will be separated from the next adjacent portion 64' by a space 70, so that, the electrical discharge will only affect the portion of the film which is adjacent the element 60.

While several preferred embodiments of the invention have been illustrated in the specification, it will be understood that these forms are shown for purposes of illustration. The illustrated forms may be employed and embodied in various other forms or employed in other uses without departing from the spirit or scope of the appended claims.

What is claimed is:

1. A high-speed optical shutter comprising
   a prism of high refractive index having an internally reflecting optical surface;
   a layer of reflection-changing material spaced from the optical surface of the prism, said layer including a fluid carrier having high refractive index and having radiation absorption means;
   an electrically conducting film contacting the layer, and means for applying an electrical potential to the conducting film;
   means for directing electromagnetic rays toward the optical surface at an incident angle greater than the critical angle for total reflection, as defined by the refractive index of the prism and the space between the prism and the layer of reflection-changing material;
   means for discharging the electrical potential across the conductive film and contacting the layer of reflection-changing material with the optical surface of the prism to absorb the electromagnetic rays.

2. The optical shutter of claim 1 wherein the fluid carrier comprises a liquid having a refractive index approximately the same as that of the prism, and the radiation absorption means includes carbon particles.

3. The optical shutter of claim 2 wherein the carbon particles are dispersed in the liquid.

4. The optical shutter of claim 2 wherein the liquid is selected from the group consisting of dibutyl phthalate, dioctyl phthalate, water, and glycerin.

5. The optical shutter of claim 2 wherein the carbon particles have a diameter of about 10 to 13 millimicrons.

6. The optical shutter of claim 1 wherein the electrically conductive film comprises a metal.

7. The optical shutter of claim 6 wherein the electrically conductive film comprises aluminum.

8. The optical shutter of claim 1 wherein the electrically conductive film and reflection-changing layer are disposed on a flexible substrate.

9. The optical shutter of claim 8 wherein the substrate has a plurality of discrete areas having an electrically conductive film and reflection-changing layer.

10. The optical shutter of claim 9 wherein the substrate comprises a filmstrip having means for restoring the optical shutter to a totally reflecting condition.

11. The optical shutter of claim 10 wherein the film strip has a wiper for removing the reflection-changing material from the internally reflecting optical surface of the prism.